US012597093B2

(12) United States Patent (10) Patent No.: US 12,597,093 B2
Peng et al. (45) Date of Patent: Apr. 7, 2026

(54) UNDERWATER IMAGE ENHANCEMENT METHOD AND IMAGE PROCESSING SYSTEM USING THE SAME

(71) Applicant: National Chengchi University, Taipei City (TW)

(72) Inventors: Yan-Tsung Peng, Taipei City (TW); Yen-Rong Chen, Taipei City (TW)

(73) Assignee: National Chengchi University, Taipei City (TW)

( * ) Notice: Subject to any disclaimer, the term of this patent is extended or adjusted under 35 U.S.C. 154(b) by 294 days.

(21) Appl. No.: 18/462,431

(22) Filed: Sep. 7, 2023

(65) Prior Publication Data

US 2024/0362750 A1 Oct. 31, 2024

(30) Foreign Application Priority Data

Apr. 27, 2023 (TW) ................................. 112115850

(51) Int. Cl.
 *G06T 5/40* (2006.01)
 *G06T 3/4046* (2024.01)
(52) U.S. Cl.
 CPC .............. *G06T 5/40* (2013.01); *G06T 3/4046* (2013.01); *G06T 2207/20084* (2013.01)
(58) Field of Classification Search
 CPC .................... G06T 5/40; G06T 3/4046; G06T 2207/20084; G06T 2207/20081; G06T 5/92
 See application file for complete search history.

(56) References Cited

U.S. PATENT DOCUMENTS 10,809,376 B2 10/2020 Chan et al.

FOREIGN PATENT DOCUMENTS

| CN | 114529484 A | * 5/2022 | ........... G06F 18/214 |
|---|---|---|---|
| CN | 114529484 | 7/2022 | |
| CN | 114387190 | 8/2022 | |
| TW | 1786592 | 12/2022 | |

OTHER PUBLICATIONS

Xueyang Fu, Xiangyong Cao, Underwater image enhancement with global-local networks and compressed-histogram equalization, Aug. 2020, Signal Processing: Image Communication, vol. 86 (Year: 2020).*
Chongyi Li et al., "Underwater Image Enhancement via Medium Transmission-Guided Multi-Color Space Embedding", IEEE Transactions on Image Processing, May 7, 2021, pp. 4985-5000.

(Continued)

*Primary Examiner* — Amandeep Saini
*Assistant Examiner* — Emma Rose Goebel
(74) *Attorney, Agent, or Firm* — JCIPRNET

(57) ABSTRACT

An underwater image enhancement method and image processing system using the same are provided. The method includes the following steps. An original underwater image is received. An original histogram of the original underwater image is generated. The original histogram is input into a deep learning model to generate an optimized histogram. An optimized underwater image is generated according to the optimized histogram and the original underwater image.

18 Claims, 5 Drawing Sheets

(56)                  References Cited

OTHER PUBLICATIONS

Chongyi Li et al., "An Underwater Image Enhancement Benchmark Dataset and Beyond", IEEE Transactions on Image Processing, Nov. 28, 2019, pp. 4376-4389.

Yan-Tsung Peng et al., "Underwater Image Restoration Based on Image Blurriness and Light Absorption", IEEE Transactions on Image Processing, Feb. 2, 2017, pp. 1579-1594.

"Office Action of Taiwan Counterpart Application", issued on Sep. 22, 2023, p. 1-p. 6.

* cited by examiner

An original underwater image is received —S201

An original histogram of the original underwater image is generated —S202

The original histogram is input into a deep learning model to generate an optimized histogram —S203

An optimized underwater image is generated according to the optimized histogram and the original underwater image —S204

UNDERWATER IMAGE ENHANCEMENT METHOD AND IMAGE PROCESSING SYSTEM USING THE SAME

CROSS-REFERENCE TO RELATED APPLICATION

This application claims the priority benefit of Taiwan application serial no. 112115850 filed on Apr. 27, 2023. The entirety of the above-mentioned patent application is hereby incorporated by reference herein and made a part of this specification.

BACKGROUND

Technical Field

The disclosure relates to an image processing technique, and in particular relates to an underwater image enhancement method and an image processing system using the same.

Description of Related Art

Underwater imaging is images taken under the surface of water, which has many different applications. For example, underwater images may be used for marine research, underwater environment monitoring, underwater resource exploration, or aquaculture fishery, etc. However, for underwater images taken in underwater environments, due to the scattering and absorption caused by the transmission of light in different media, the color and contrast of the image have serious deviations. Generally speaking, when dealing with poor-quality images such as underwater images, image enhancement or image restoration methods are usually used for image processing in an attempt to obtain underwater images with better image quality. With the advancement of deep learning methods, many current studies have focused on using deep learning models to improve the image quality of underwater images. It may be seen that training a deep learning model for optimizing underwater images generally requires a large amount of training data (i.e., many pairs of original underwater images and real reference images), so that the trained deep learning model may effectively improve the quality of underwater images. However, in reality, it is usually difficult to obtain pairs of original underwater images and real reference images, that is, underwater images suffer from a lack of corresponding clear data, which imposes significant constraints on model training, and the image enhancement performance of deep learning models often falls short of expectations.

SUMMARY

In view of this, an underwater image enhancement method and image processing system using the same, which may alleviate the high demand for training data by deep learning models, and may perform enhancement processing on underwater images for a high degree of restoration and good color representation, are provided.

An embodiment of the disclosure provides an underwater image enhancement method, including the following steps. An original underwater image is received. An original histogram of the original underwater image is generated. The original histogram is input into a deep learning model to generate an optimized histogram. An optimized underwater image is generated according to the optimized histogram and the original underwater image.

An embodiment of the disclosure provides an image processing system, which includes a storage circuit and a processor. The processor is coupled to the storage circuit and is configured to execute the following steps. An original underwater image is received. An original histogram of the original underwater image is generated. The original histogram is input into a deep learning model to generate an optimized histogram. An optimized underwater image is generated according to the optimized histogram and the original underwater image.

Based on the above, in the embodiment of the disclosure, after the original histogram of the original underwater image is generated, a deep learning model is used to perform histogram-to-histogram conversion to estimate an optimized histogram. Afterwards, an optimized underwater image may be generated based on the optimized histogram and the original underwater image. Compared with the conventional deep learning model that learns based on multiple images with a large amount of data and high diversity, the deep learning model of the embodiment of the disclosure learns based on histograms with a small amount of data and low diversity. Based on this, the embodiment of the disclosure may use the deep learning model to generate an optimized underwater image with a high degree of restoration and good color representation under the scenario of limited training data.

BRIEF DESCRIPTION OF THE DORIGINALINGS

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the method and system within the scope of the patent application of the disclosure.

Figure 1:
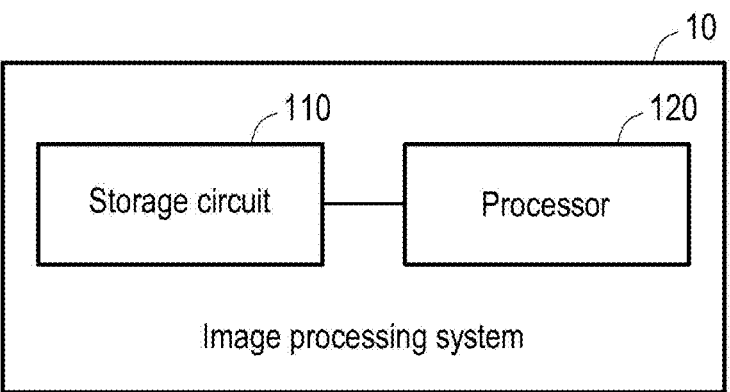
FIG. 1 is a schematic diagram of an image processing system according to an embodiment of the disclosure.

FIG. 1 is a schematic diagram of an image processing system according to an embodiment of the disclosure. The image processing system 10 includes a storage circuit 110 and a processor 120. The image processing system 10 may be implemented as a computer device with computing capabilities. In different embodiments, the image processing system 10 is, for example, various computer devices and/or server devices, but not limited thereto.

The storage circuit 110 is configured to store data and various program codes or various commands accessed by the processor 120, which may be, for example, any type of fixed or movable random access memory (RAM), read-only memory (ROM), flash memory, or a combination thereof.

The processor 120 is coupled to the storage circuit 110, in which the processor 120 can, for example, a central processing unit (CPU), an application processor (AP), or other programmable general-purpose or special-purpose microprocessor, a digital signal processor (DSP), an image signal processor (ISP), a graphics processing unit (GPU) or other similar devices, integrated circuits, and combinations thereof. The processor 120 may access and execute the program codes and software modules recorded in the storage circuit 110, so as to implement the method for improving image quality in the embodiment of the disclosure.

In this embodiment, the storage circuit 110 of the image processing system 10 stores multiple program code segments, and the above program code segments are executed by the processor 120 after being loaded. For example, the storage circuit 110 records multiple modules, and each operation applied in the image processing system 10 is respectively executed by these modules, in which each module is formed of one or more program code segments. However, the disclosure is not limited thereto, and various operations of the image processing system 10 may also be implemented in other hardware forms.

Figure 2:
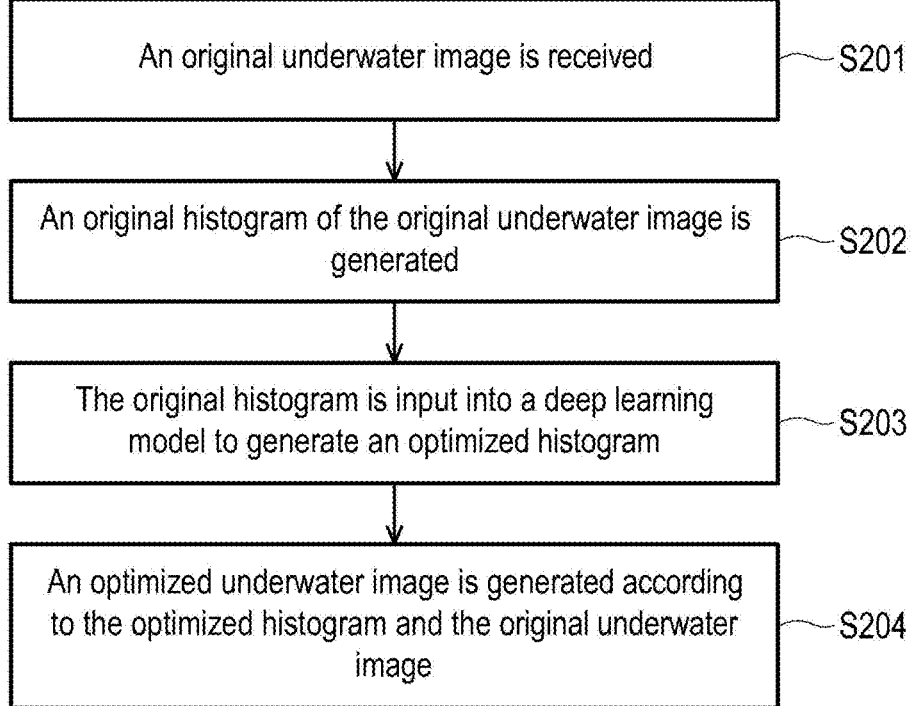
FIG. 2 is a flowchart of an underwater image enhancement method according to an embodiment of the disclosure.
Figure 3:
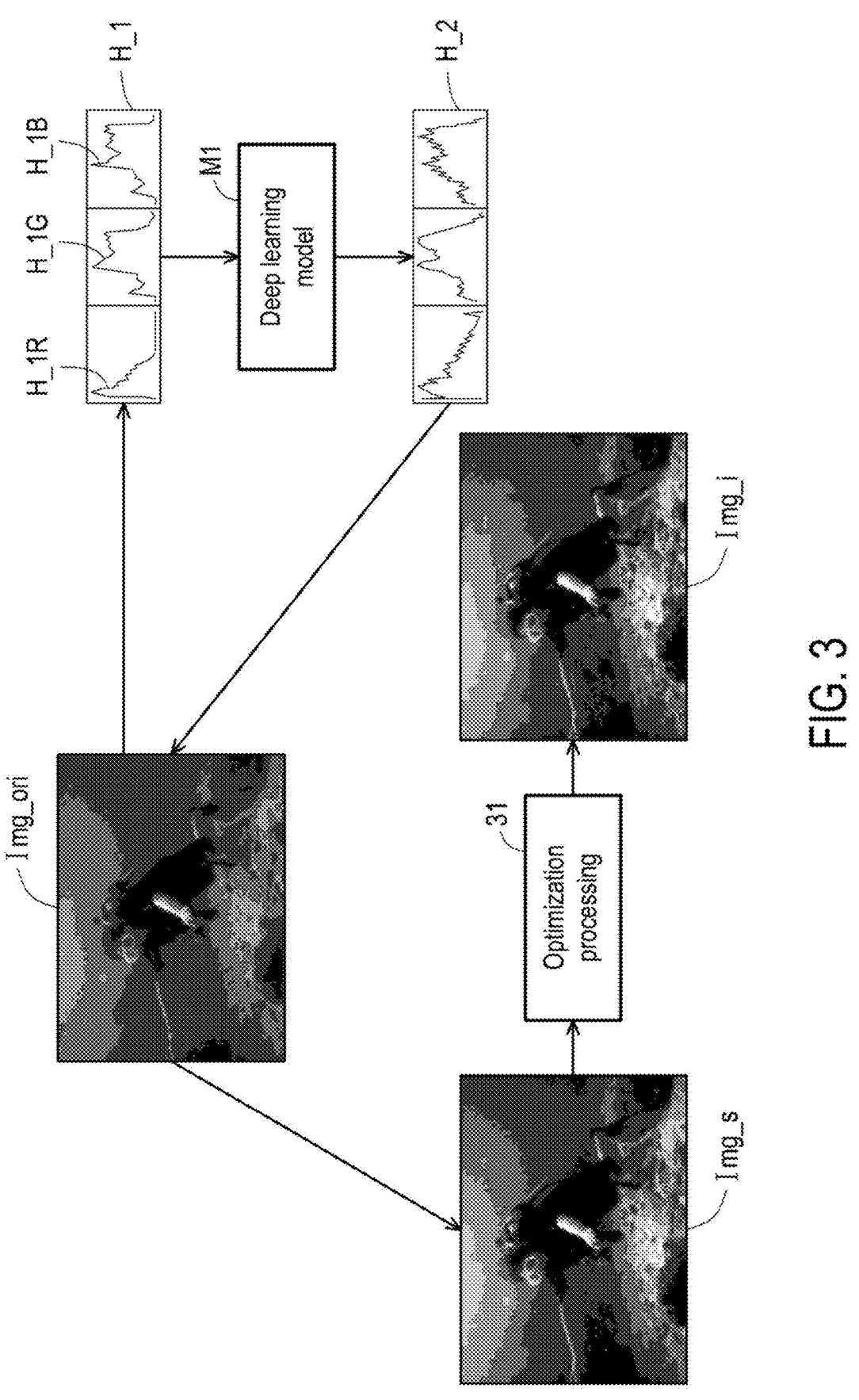
FIG. 3 is a schematic diagram of an underwater image enhancement method according to an embodiment of the disclosure.

FIG. 2 is a flowchart of an underwater image enhancement method according to an embodiment of the disclosure. FIG. 3 is a schematic diagram of an underwater image enhancement method according to an embodiment of the disclosure. Referring to FIG. 1, FIG. 2, and FIG. 3, the method of this embodiment is adapted for the image processing system 10 in the aforementioned embodiment, and the following in combination with various elements in the image processing system 10 describes the detailed steps of the method for improving image quality of this embodiment.

In step S201, the processor 120 receives the original underwater image Img_ori. The original underwater image Img_ori is an image generated by shooting an underwater scene with an image capture device. In some embodiments, the original underwater image Img_ori may be an RGB image, that is, each pixel in the original underwater image Img_ori has a red channel value, a green channel value, and a blue channel value. Since the original underwater image Img_ori is shot underwater, the original underwater image Img_ori may have poor contrast, low brightness, distorted color cast, or poor visibility.

In step S202, the processor 120 generates an original histogram H_1 of the original underwater image Img_ori. In some embodiments, the original histogram H_1 includes histograms corresponding to multiple color channels. As shown in FIG. 3, the original histogram H_1 may include a red histogram H_1R corresponding to the red channel; a green histogram H_1G corresponding to the green channel; and a blue histogram H_1B corresponding to the blue channel. Furthermore, the processor 120 may respectively count the red channel value, the green channel value, and the blue channel value of all the pixels in the original underwater image Img_ori to generate the red histogram H_1R, the green histogram H_1G, and the blue histogram Figure H_1B. For example, the red histogram H_1R includes statistical pixel count respectively corresponding to red pixel values 0 to 255. The green histogram H_1G includes statistical pixel count respectively corresponding to green pixel values 0 to 255. The blue histogram H_1B includes statistical pixel count respectively corresponding to blue pixel values 0 to 255.

In step S203, the processor 120 inputs the original histogram H_1 into the deep learning model M1, and generates the optimized histogram H_2 through the deep learning model M1. In other words, the model input data of the deep learning model M1 is the original histogram H_1, while the model output data of the deep learning model M1 is the optimized histogram H_2.

In some embodiments, the processor 120 may integrate the original histogram H_1 into a two-dimensional input matrix, and then input the input matrix into the deep learning model M1. For example, taking FIG. 3 as an example, the red histogram H_1R, the green histogram H_1G, and the blue histogram H_1B may be respectively converted into three sub-matrices of 1*256, and then the processor 120 may obtain an input matrix of 1*256*3 by merging these three sub-matrices. In some embodiments, the processor 120 may first convert the distribution of pixel values (i.e., red pixel value, green pixel value, and blue pixel value) in the above three sub-matrices into a probability form, and then merge the three sub-matrices to obtain the input matrix. Each matrix element in the three sub-matrices converted into a probability form is a probability value between 0 and 1. For example, after converting the distribution corresponding to the red pixel value in the red histogram H_1R into a probability form, the 256 matrix elements corresponding to the red pixel values 0 to 255 in the sub-matrix are all a probability value, and the sum of the matrix elements corresponding to the red pixel values 0 to 255 in the sub-matrix is 1.

In step S204, the processor 120 may generate the optimized underwater image Img_i according to the optimized histogram H_2 and the original underwater image Img_ori. In some embodiments, based on the histogram specification processing (or referred to as histogram matching processing), the processor 120 may adjust the original underwater image Img_ori to a target image Img_s conforming to the optimized histogram H_2 according to the optimized histogram H_2. In other words, the optimized histogram H_2 is the result of performing histogram statistics on the target image Img_s. It should be noted that, in one embodiment, for the relevant details of the histogram specification processing, reference may be made to relevant technical documents (e.g., "D. Coltuc, P. Bolon, and J. M. Chassery, 'Exact histogram specification,' IEEE Trans. on Image Processing, 2006."), and details are not repeated herein.

Afterwards, the processor 120 may perform optimization processing 31 on the target image Img_s to generate an optimized underwater image Img_i. In some embodiments, the processor 120 may utilize another deep learning model to perform optimization processing 31 on the target image Img_s. In detail, the processor 120 may use the optimized histogram H_2 to adjust the original underwater image Img_ori to obtain the target image Img_s. Afterwards, the processor 120 may input the target image Img_s into another deep learning model, and generate an optimized underwater image Img_i through another deep learning model. Alternatively, in some other embodiments, the processor 120 may use other image detail enhancement techniques to perform optimization processing 31 on the target image Img_s to generate an optimized underwater image Img_i.

It should be noted that the data volume and diversity of the original histogram generated through statistics are generally less than the data volume and diversity of the original underwater image. Based on this, since the deep learning model M1 performs histogram-to-histogram conversion, the embodiment of the disclosure may not only generate an optimized underwater image with high color balance and good quality, but also effectively increase the calculation rate. In addition, compared with the conventional deep learning model that performs image-to-image conversion, the embodiments of the disclosure may use less training data to achieve ideal model accuracy.

In an embodiment of the disclosure, the deep learning model M1 may be a transformer-based model, and the processor 120 may use a generative adversarial network (GAN) model to perform optimization processing 31 on the target image Img_s. An embodiment is given below for detailed illustration.

Figure 4:
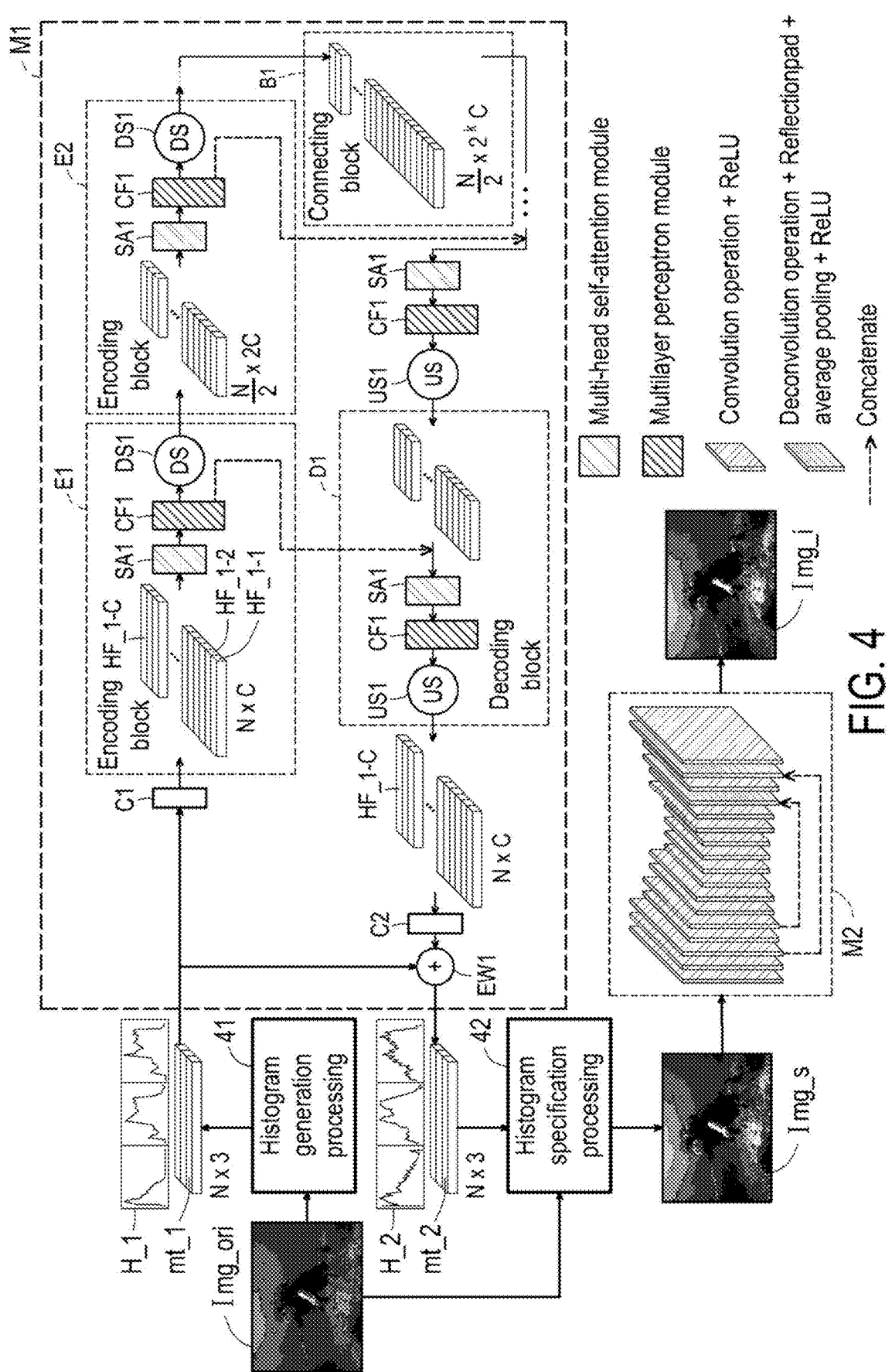
FIG. 4 is a schematic diagram of an underwater image enhancement method according to an embodiment of the disclosure.

FIG. 4 is a schematic diagram of an underwater image enhancement method according to an embodiment of the disclosure. Referring to FIG. 4, the processor 120 may perform histogram generation processing 41 on the original underwater image Img_ori to obtain the original histogram H_1. In this embodiment, the original histogram H_1 may be converted into an input matrix mt_1 of 1*N*3. N is the number of statistical bins of the original histogram H_1, which is, for example, 256.

Next, the processor 120 may input the input matrix mt_1 to the deep learning model M1 whose architecture is a transformer-based model. The transformer-based model (i.e., the deep learning model M1) includes multiple conversion blocks connected in sequence. These conversion blocks include multiple encoding blocks (e.g., encoding blocks E1, E2) and multiple decoding blocks (e.g., decoding block D1). In some embodiments, the deep learning model M1 may include k encoding blocks and k decoding blocks. For example, k may be equal to 4. However, it should be noted that FIG. 4 is only an implementation example, and the number and configuration of the encoding blocks and decoding blocks in the deep learning model M1 may be set according to actual requirements. In this embodiment, multiple encoding blocks are sequentially connected, and multiple decoding blocks are sequentially connected. In addition, the deep learning model M1 may further include a connecting block B1 connected between multiple encoding blocks and multiple decoding blocks.

Each conversion block (such as the encoding blocks E1 and E2, and the decoding block D1) in the deep learning model M1 may include a self-attention module SA1 and a multilayer perceptron (MLP) module CF1. In addition, the connecting block B1 may also include a self-attention module (not shown) and a multilayer perceptron module (not shown). Also, each encoding block (e.g., the encoding block E1 and E2) may include a downsampling module DS1, and each decoding block (e.g., the decoding block D1) may include an upsampling module US1. The output of the self-attention module SA1 of each conversion block is connected to the input of the multilayer perceptron module CF1. The output of the multilayer perceptron module CF1 of each encoding block is connected to the input of the downsampling module DS1, and the output of the multilayer perceptron module CF1 of each decoding block is connected to the input of the upsampling module US1.

The transformer-based model also includes a first convolution module C1, a second convolution module C2 and an adding module EW1. The original histogram H_1 is input to the first convolution module C1. That is to say, the input matrix mt_1 corresponding to the original histogram H_1 may be input to the first convolution module C1. The first convolution module C1 may use multiple convolution kernels to perform one-dimensional convolution operation to output multiple histogram features HF_1-1, HF_1-2, . . . , HF_1-C. In the example shown in FIG. 4, the C histogram features HF_1-1, HF_1-2, . . . , HF_1-C may respectively be feature matrices of 1*M, where C is an integer greater than 3 and M is equal to N. The output of the first convolution module C1 is connected to one of the encoding blocks. Here, the output of the first convolution module C1 is connected to the encoding block E1.

Then, multiple encoding blocks (e.g., encoding blocks E1 and E2), the connecting block Bi, and multiple decoding blocks (e.g., decoding block D1) may sequentially perform self-attention processing, multilayer perceptron processing, or up/downsample processing on the input histogram features, and feed the output histogram features into the next encoding block, next decoding block, or connecting block B1. In addition, it should be noted that based on the residual learning strategy and in order to preserve the lost information of the encoding block in the downsampling operation, the output of the multilayer perceptron module CF1 of each encoding block are merged with the histogram features output by the corresponding decoding block. This above-mentioned merging operation could be concatenation or addition connection.

As shown in FIG. 4, C histogram features HF_1-1, HF_1-2, . . . , HF_1-C are input to the encoding block E1. The 2C histogram features input to the encoding block E2 are the histogram features output by the encoding block E1, so on and so forth. The $2^k$C histogram features input to the connecting block B1 are the histogram features output by the last encoding block, and the histogram features output by the connecting block B1 are input to the connected first decoding block. Aside from the first decoding block, the histogram features input to each remaining decoding block (e.g., the decoding block D1) are the merged result of the histogram feature output by the previous decoding block and the output of the multilayer perceptron module CF1 of the corresponding encoding block. For example, the histogram feature input to the decoding block D1 is the merged result of the output of the multilayer perceptron module CF1 of the encoding block E1 with the histogram feature output from the previous encoding block.

The input of the second convolution module C2 is connected to the output of one of these decoding blocks. Here, the input of the second convolution module C2 is connected to the output of the decoding block D1. The decoding block D1 is the last decoding block. The first convolution module C2 may use multiple convolution kernels to perform one-dimensional convolution operation. Here, the C histogram features output by the decoding block D1 may respectively be feature matrices of 1*M, where C is an integer greater than 3 and M is equal to N. The C histogram features output by the decoding block D1 may be fed into the second convolution module C2, and the output of the second convolution module C2 is connected to the input of the adding module EW1. The original histogram Img_ori is input to another input of the adding module EW1. The adding module EW1 may output the optimized histogram H_2. In detail, the adding module EW1 may perform element-wise addition on the input matrix mt_1 corresponding to the original histogram Img_ori and the output matrix of the second convolution module C2 to generate the output matrix mt_2 corresponding to the optimized histogram H_2. In addition, the output matrix mt_2 may be converted into an optimized histogram H_2.

Next, the processor 120 may perform histogram specification processing 42 according to the original underwater image Img_ori and the optimized histogram H_2 to obtain the target underwater image Img_s. In order to further optimize the details and naturalness of the target underwater image Img_s, in this embodiment, the processor 120 may apply the generative adversarial network model M2 to optimize the target underwater image Img_s. The generative adversarial network model M2 may output the optimized underwater image Img_i according to the target underwater image Img_s. The generative adversarial network model has a generator and a discriminator. Through the interactive training between the generator and the discriminator, the discriminator may guide the generator to generate a result closer to the real image, such that the image generated by the generator may preserve more image details and reproduce the natural feeling of the image. That is to say, in one embodiment, the final output optimized underwater image Img_i is generated by a conditional generative adversarial network model generator. For details about using the generative adversarial network model M2, reference may be made to relevant technical literature (e.g., "R. Qian, R. T. Tan, W. Yang, J. Su, and J. Liu, 'Attentive generative adversarial network for raindrop removal from a single image,' in Proc. Conf. Computer Vision and Pattern Recognition, 2018."), and are not repeated herein.

It should be noted that since the target underwater image Img_s generated based on the optimized histogram H_2 mainly restores the color of the image, the embodiment of the disclosure may be used with the adversarial network model M2 to enhance the details of the target underwater image Img_s. In this way, the final optimized underwater image Img_i not only has good color representation but also clear image details.

It is worth mentioning that the self-attention module of each conversion block in the deep learning model M1 may use a multi-head self-attention mechanism, and may include the intra-histogram self-attention module and the inter-histogram self-attention module sequentially connected. It should be noted that the self-attention module SA1 and the multilayer perceptron module CF1 of each encoding block and each decoding block operate in the same manner.

Figure 5:
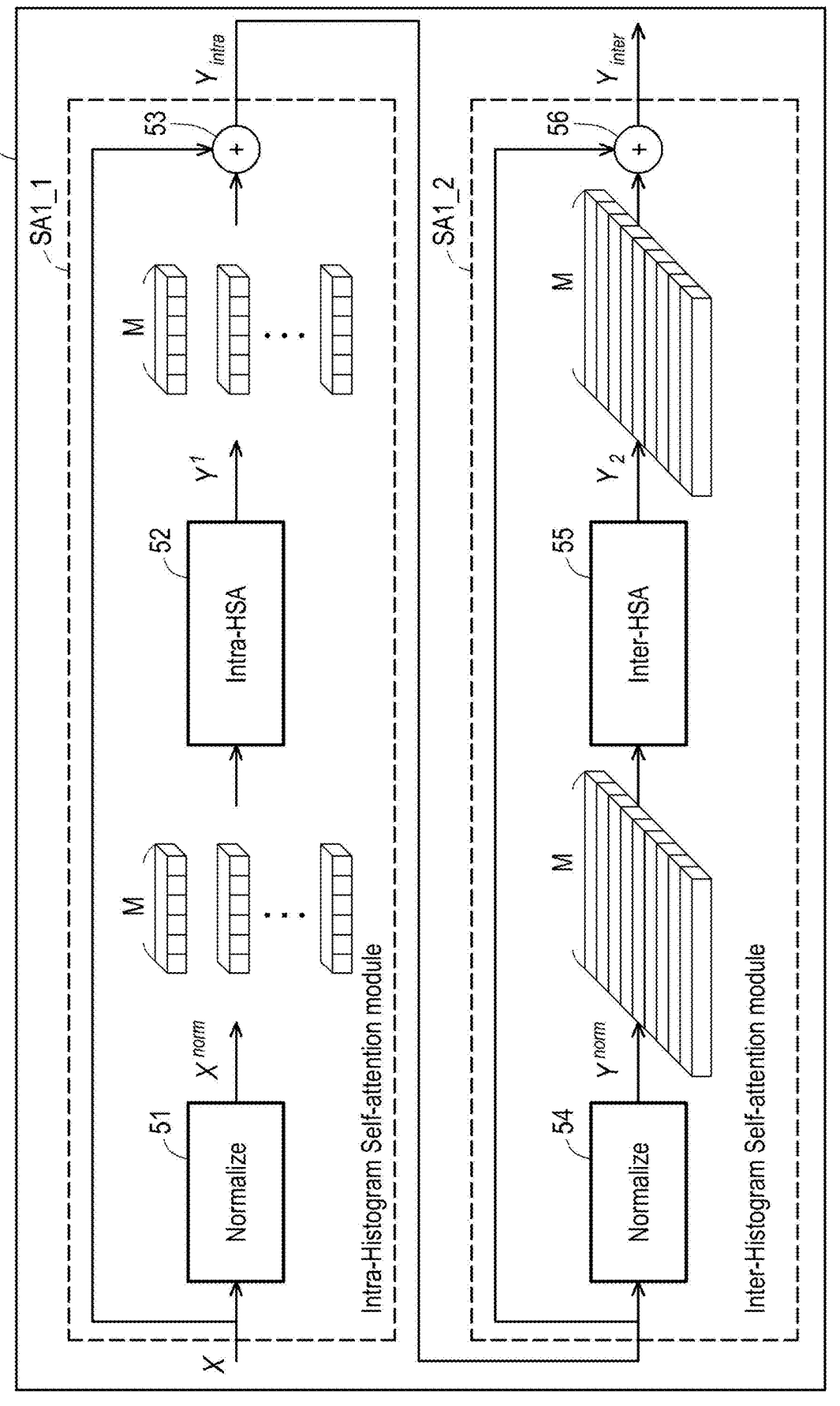
FIG. 5 is a schematic diagram of a self-attention module according to an embodiment of the disclosure.

FIG. 5 is a schematic diagram of a self-attention module according to an embodiment of the disclosure. Referring to FIG. 5, the self-attention module SA1 may include the intra-histogram self-attention (Intra-HSA) module SA1_1 and the inter-histogram self-attention (Inter-HSA) module SA1_2. The output of the intra-histogram self-attention module SA1_1 is connected to the input of the inter-histogram self-attention module SA1_2. The multiple histogram features input to the intra-histogram self-attention module SA1_1 are respectively feature matrices of 1*M, and each histogram feature input to the intra-histogram self-attention module SA1_1 includes M feature values. Taking FIG. 4 as an example, the C histogram features input to the intra-histogram self-attention module SA1_1 of the encoding block E1 are respectively feature matrices of 1*N and each includes N feature values. The 2C histogram features input to the intra-histogram self-attention module SA1_1 of the encoding block E2 are respectively feature matrices of 1*N/2 and each includes N/2 feature values.

In FIG. 5, the intra-histogram self-attention module SA1_1 may generate multiple intra-histogram self-attention features $Y_{intra}$ based on one feature value corresponding to one position token. That is, the token size used by the self-attention module SA1_1 in the histogram is 1*1. In detail, the intra-histogram self-attention module SA1_1 may firstly perform normalization 51 on the input multiple histogram features X, so as to generate multiple normalized histogram features $X^{norm}$. Afterwards, the intra-histogram self-attention module SA1_1 may perform intra-histogram self-attention processing 52 according to the normalized multiple histogram features $X^{norm}$. The intra-histogram self-attention module SA1_1 may use a multi-head self-attention mechanism to perform intra-histogram self-attention processing 52. However, the disclosure does not limit the number of heads of the multi-head self-attention mechanism, which may be set according to actual needs. For each histogram feature $X^{norm}$, the processor 120 may divide a single histogram feature $X^{norm}$ into multiple tokens, and these position markers respectively correspond to a feature value.

Thus, the processor 120 may calculate the query matrix, key matrix, and value matrix of each head for each feature value in each histogram feature $X^{norm}$, to redistribute the weights of each feature value in each histogram feature $X^{norm}$. Specifically, the processor 120 may calculate the correlation between each feature value and other feature values in a certain histogram feature $X^{norm}$, to redistribute the weights of each feature value in the histogram feature $X^{norm}$. Therefore, the processor 120 may generate multiple attention vectors Y1 respectively corresponding to the normalized histogram features $X^{norm}$ through the intra-histogram self-attention processing 52. Afterwards, the intra-histogram self-attention module SA1_1 may perform element-wise addition processing 53 on the input histogram feature X and the attention vector Y1 to obtain multiple intra-histogram self-attention features $Y_{intra}$.

Next, the intra-histogram self-attention features $Y_{intra}$ are input to the inter-histogram self-attention module SA1_2. The multiple histogram self-attention features $Y_{intra}$ input to the inter-histogram self-attention module SA1_2 aer respectively feature matrices of 1*M. The inter-histogram self-attention module SA1_2 may generate multiple inter-histogram self-attention features $Y_{inter}$ based on one intra-histogram self-attention feature $Y_{intra}$ corresponding to one token. That is, the token size used by the inter-histogram self-attention module SA1_2 is 1*M. In detail, the inter-histogram self-attention module SA1_2 may firstly perform normalization 51 the input multiple intra-histogram self-attention features $Y_{intra}$ to generate multiple normalized histogram features $Y^{norm}$.

Afterwards, the inter-histogram self-attention module SA1_2 may perform inter-histogram self-attention processing 55 according to the normalized multiple histogram features $Y^{norm}$. The inter-histogram self-attention module SA1_2 may use a multi-head self-attention mechanism to perform inter-histogram self-attention processing 55. However, the disclosure does not limit the head number of the multi-head self-attention mechanism, which may be set according to actual requirements. Different from the intra-histogram self-attention module SA1_1, the inter-histogram self-attention module SA1_2 respectively uses each histogram feature $Y^{norm}$ as a token to perform inter-histogram self-attention processing 55. These position tokens respectively correspond to a histogram feature $Y^{norm}$ of 1*M.

Thus, the processor 120 may calculate the query matrix, the key matrix, and the value matrix of each head respectively for each histogram feature $Y^{norm}$, to redistribute the weights of each histogram feature $Y^{norm}$. Specifically, the processor 120 may calculate the correlation between each histogram feature $Y^{norm}$ and other histogram features, to redistribute the weights of each histogram feature $Y^{norm}$. Therefore, the processor 120 may generate multiple attention vectors Y2 respectively corresponding to the normalized histogram features $Y^{norm}$ through the inter-histogram self-attention processing 55. Afterwards, the inter-histogram self-attention module SA1_2 may perform element-wise addition processing 56 on the inter-histogram self-attention feature $Y_{intra}$ and the attention vector Y2 to obtain multiple inter-histogram self-attention features $Y_{inter}$. These inter-histogram self-attention features $Y_{inter}$ are fed into the multilayer perceptron module CF1.

In some embodiments, the multilayer perceptron module CF1 may be a 2D convolutional feed-forward network (2D-CFF). In addition to convolution processing, the multilayer perceptron module CF1 may also include normalization processing, linear projection processing, and reshape processing, etc.

In some embodiments, the processor 120 may train the deep learning model M1 based on the weighted sum of multiple loss functions. The processor 120 may determine whether the learning of the deep learning model M1 is completed according to the weighted sum of these loss functions. Moreover, the processor 120 may adjust the weight parameters of the deep learning model M1 one by one from the back to the front in a backward transfer manner according to the weighted sum of these loss functions.

In some embodiments, the aforementioned loss functions may include a first loss function, a second loss function, and a third loss function. The first loss function calculates the first loss value $\mathcal{L}_{his}$ according to the reference histogram of the real reference image and the optimized histogram H_2. The second loss function calculates the second loss value $\mathcal{L}_{hm}$ according to the target image Img_s and the real reference image through the error calculation method. The third loss function calculates the third loss value $\mathcal{L}_{hl}$ according to the target image Img_s and the real reference image through another error calculation method.

In some embodiments, during the model training process, after the optimized histogram H_2 is generated, the first loss value $\mathcal{L}_{his}$ may be calculated using the following Formula (1) of the first loss function. Referring to Formula (1), it may be seen that the processor 120 may calculate the mean absolute error (MAE) between the optimized histogram H_2 and the reference histogram to generate the first loss value $\mathcal{L}_{his}$. In addition, in some embodiments, the processor 120 may calculate the first loss value $\mathcal{L}_{his}$ according to respective weight values of multiple color channels.

$$\mathcal{L}_{his} = \frac{1}{N}\sum_{j=0}^{2} w_j \sum_{i=0}^{N-1} (H_{ij}^{out} - H_{ij}^{ref})^2 \qquad \text{Formula (1)}$$

Where $$H_{ij}^{out}$$

represents the optimized histogram H_2;

$$H_{ij}^{ref}$$

represents a reference histogram of the real reference image; N represents the number of statistical bins of the histogram; j is the index of multiple color channels; i is the index of multiple statistical bins (also may be regarded as multiple color channel values) in the histogram; $w_j$ represents the weight value corresponding to the $j^{th}$ color channel. In some embodiments, the weight value of the red channel among the color channels may be set to be greater than the weight values of other color channels. Here, assuming that j=0 represents the red channel, j=1 represents the green channel, and j=2 represents the blue channel, then the weight value of the red channel may be greater than the weight value of the green channel and the weight value of the blue channel. The reason for setting these weight values in this way is that underwater images often have the highest distortion of the red channel value, so it is expected that the deep learning model M1 may restore the red channel value as much as possible.

In some embodiments, during the model training process, after the target image Img_s is generated, the second loss value $\mathcal{L}_{hm}$ may be calculated using the following Formula (2) of the second loss function. Referring to Formula (2), it may be seen that the processor 120 may calculate the mean absolute error (MAE) between the target image Img_s and the real reference image to generate the second loss value $\mathcal{L}_{hm}$.

$$\mathcal{L}_{hm} = \frac{1}{HWC}\|S - T\|_1 \qquad \text{Formula (2)}$$

Where S represents the target image Img_s; T represents the real reference image; H represents the image height of the target image Img_s and the real reference image; W represents the image width of the target image Img_s and the real reference image; C represents the number of color channels.

In addition, in this embodiment, during the model training process, after the target image Img_s is generated, the third loss value $\mathcal{L}_{hl}$ may be calculated using the following Formula (3) of the third loss function. Here, the third loss value $\mathcal{L}_{hl}$ may be a high-order feature loss based on the VGG-19 network. For details about calculating the high-order feature loss based on the VGG-19 network, reference may be made to relevant technical literature (e.g., as "J. Deng, W. Dong, R. Socher, L. J. Li, K. Li, and L. Fei-Fei, 'Imagenet: A large-scale hierarchical image database,' in Proc. Conf. Computer Vision and Pattern Recognition, 2009."), and are not repeated herein.

$$\mathcal{L}_{hl} = \mathbb{E}_{S,T}\left[\|\Phi^j(S) - \Phi^j(T)\|_2\right] \qquad \text{Formula (3)}$$

Where, $\mathbb{E}_{S,T}$ represents the calculated expected value; $\Phi^j(S)$ represents the feature generated by the VGG-19 network at the $j^{th}$ layer when the target image Img_s is input into the VGG-19 network; $\Phi^j(T)$ represents the feature generated by the VGG-19 network at the $j^{th}$ layer when the real reference image is input into the VGG-19 network.

In addition, in some embodiments, the processor 120 may simultaneously train the deep learning model M1 and the generative adversarial network model M2 based on the weighted sum of multiple loss functions. The processor 120 may determine whether the learning of the deep learning model M1 and the generative adversarial network model M2 are completed according to the weighted sum of these loss functions. Moreover, the processor 120 may respectively adjust the weight parameters of the deep learning model M1 and the weight parameters of the generative adversarial network model M2 one by one from the back to the front in a backward transfer manner according to the weighted sum of these loss functions.

In some embodiments, in the case of optimizing the target image Img_s by using the generative adversarial network model M2, in addition to the first loss function, the second loss function, and the third loss function, the above loss functions may also include a fourth loss function and a fifth loss function. The fourth loss function calculates the fourth loss value $\mathcal{L}_{GAN}$ according to the target image Img_s, the real reference image, and the optimized underwater image Img_i through the generative adversarial network error calculation method. The fifth loss function calculates a fifth loss value $\mathcal{L}_{con}$ according to the optimized underwater image Img_i and the real reference image.

In some embodiments, during the model training process, after the optimized underwater image Img_i is generated, the fourth loss value $\mathcal{L}_{GAN}$ may be calculated using the following Formula (4) of the fourth loss function.

$$\mathcal{L}_{GAN} = \mathcal{L}_{adv} + \mathcal{L}_{L1}$$ Formula (4)

The consistency loss $\mathcal{L}_{L1}$ may be generated according to the following Formula (5), and the adversarial loss $\mathcal{L}_{adv}$ may be calculated according to the following Formula (6). Where Formula (5) is a mean absolute error (MAE) function. Formula (6) is the cross-entropy loss function.

$$\mathcal{L}_{L1} = \mathbb{E}_{S,T}[\|G(S) - T\|_1]$$ Formula (5)

$$\mathcal{L}_{adv} = \mathbb{E}_{S,T}[\log D(S, T)] + \mathbb{E}_S[\log(1 - D(S, G(S)))]$$ Formula (6)

Where G(S) represents the optimized underwater image Img_i; S represents the target image Img_s; T represents the real reference image.

In some embodiments, during the model training process, after the optimized underwater image Img_i is generated, the fifth loss value $\mathcal{L}_{con}$ may be calculated using the following Formula (7) of the fifth loss function. Here, the fifth loss value $\mathcal{L}_{con}$ may be a high-order feature loss based on the VGG-19 network. For relevant details about calculating the high-order feature loss based on the VGG-19 network, reference may be made to relevant technical documents, and are not repeated herein.

$$\mathcal{L}_{con} = \sum_{j \in 1,3,6,8} \mathbb{E}_{I_f,T}[\|\Phi^j(I_f) - \Phi^j(T)\|_2^2]$$ Formula (7)

Among them, $\mathbb{E}_{I_f,T}$ represents the calculated expected value; $\Phi^j(I_f)$ represents the feature generated by the VGG-19 network at the $j^{th}$ layer when the optimized underwater image Img_i is input into the VGG-19 network; $\Phi_j(T)$ represents the feature generated by the VGG-19 network at the $j^{th}$ layer when the real reference image is input into the VGG-19 network In some embodiments, the weighted sum of multiple loss functions (i.e., the total loss value) may be expressed as Formula (8).

$$\mathcal{L} = \mathcal{L}_{his} + \lambda_1 \mathcal{L}_{hm} + \lambda_2 \mathcal{L}_{hl} + \lambda_3 \mathcal{L}_{GAN} + \lambda_4 \mathcal{L}_{con}$$ Formula (8)

12

Wherein, $\lambda_1$, $\lambda_2$, $\lambda_3$, and $\lambda_4$ may be set according to actual requirements, and are not limited in the disclosure.

To sum up, in the embodiment of the disclosure, an original histogram may be generated for the original underwater image, and the original histogram may be input into a deep learning model to generate an optimized histogram. Afterwards, through the histogram specification process, the color representation of the original histogram may be adjusted according to the optimized histogram to generate the target image. Moreover, the target image may be input into a generative adversarial network to enhance image details to generate a final optimized underwater image. In this way, the embodiments of the disclosure may generate optimized underwater images with high color and clear details. In addition, since the data amount and diversity of the original histogram are generally less than that of the original underwater image, the embodiment of the disclosure may achieve ideal model performance with a lower amount of training data than the conventional technology. In addition, the embodiment of the disclosure performs intra-histogram self-attention processing and inter-histogram self-attention processing according to the histogram features, therefore, a good histogram may be estimated.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An underwater image enhancement method, comprising:
   receiving an original underwater image;
   generating an original histogram of the original underwater image;
   inputting the original histogram into a deep learning model to generate an optimized histogram;
   generating an optimized underwater image according to the optimized histogram and the original underwater image; and
   training the deep learning model based on a weighted sum of a plurality of loss functions,
   wherein the loss functions comprise a first loss function, a second loss function, and a third loss function, the first loss function calculates a first loss value according to a reference histogram of a real reference image and the optimized histogram, the second loss function calculates a second loss value according to the target image and the real reference image through an error calculation method, and the third loss function calculates a third loss value according to the target image and the real reference image through another error calculation method.

2. The underwater image enhancement method according to claim 1, wherein the original histogram comprises histograms corresponding to a plurality of color channels.

3. The underwater image enhancement method according to claim 1, wherein the deep learning model is a transformer-based model, the transformer-based model comprises a plurality of conversion blocks sequentially connected, the conversion blocks comprise a plurality of encoding blocks and a plurality of decoding blocks, and self-attention modules of each of the conversion blocks comprise an intra-histogram self-attention module and an inter-histogram self-attention module.

4. The underwater image enhancement method according to claim 3, wherein an output of the intra-histogram self-attention module is connected to an input of the inter-histogram self-attention module, a plurality of histogram features input to the intra-histogram self-attention module are respectively feature matrices of 1*M, the histogram features comprise M feature values, the intra-histogram self-attention module generates a plurality of intra-histogram self-attention features based on one feature value corresponding to one position token, the intra-histogram self-attention features input to the inter-histogram self-attention module are respectively feature matrices of 1*M, the inter-histogram self-attention module generates a plurality of inter-histogram self-attention features based on one histogram self-attention feature corresponding to one position token.

5. The underwater image enhancement method according to claim 3, wherein each of the conversion blocks further comprises a multilayer perceptron module, each of the encoding blocks comprises a downsampling module, each of the decoding blocks comprises an upsampling module, an output of the self-attention module of each of the conversion blocks is connected to an input of the multilayer perceptron module, an output of the multilayer perceptron module of each of the encoding blocks is connected to an input of the downsampling module, an output of the multilayer perceptron module of each of the decoding blocks is connected to an input of the upsampling module.

6. The underwater image enhancement method according to claim 3, wherein the transformer-based model further comprises a first convolution module, a second convolution module, and an adding module, the original histogram is input to the first convolution module, an output of the first convolution module is connected to one of the encoding blocks, an input of the second convolution module is connected to an output of one of the decoding blocks, an output of the second convolution module is connected to an input of the adding module, the original histogram is input to another input of the adding module, and the adding module outputs the optimized histogram.

7. The underwater image enhancement method according to claim 1, wherein generating the optimized underwater image according to the optimized histogram and the original underwater image comprises:

adjusting the original underwater image by using the optimized histogram to obtain a target image; and inputting the target image into another deep learning model, and generating the optimized underwater image through the another deep learning model.

8. The underwater image enhancement method according to claim 1, wherein the another deep learning model is a generative adversarial network (GAN) model, the loss functions further comprise a fourth loss function and a fifth loss function, a fourth loss function calculates a fourth loss value according to the target image, the real reference image, and the optimized underwater image through a generative adversarial network error calculation method, and the fifth loss function calculates a fifth loss value according to the optimized underwater image and the real reference image.

9. The underwater image enhancement method according to claim 1, wherein training the deep learning model based on the weighted sum of the loss functions comprises:

calculating the first loss value according to a weight value of each of a plurality of color channels, wherein the weight value of a red channel among the color channels is greater than the weight value of other color channels.

10. An image processing system, comprising:

a storage circuit;

a processor, coupled to the storage circuit and configured to:

receive an original underwater image;

generate an original histogram of the original underwater image;

input the original histogram into a deep learning model to generate an optimized histogram;

generate an optimized underwater image according to the optimized histogram and the original underwater image; and train the deep learning model based on a weighted sum of a plurality of loss functions, wherein the loss functions comprise a first loss function, a second loss function, and a third loss function, the first loss function calculates a first loss value according to a reference histogram of a real reference image and the optimized histogram, the second loss function calculates a second loss value according to the target image and the real reference image through an error calculation method, and the third loss function calculates a third loss value according to the target image and the real reference image through another error calculation method.

11. The image processing system according to claim 10, wherein the original histogram comprises histograms corresponding to a plurality of color channels.

12. The image processing system according to claim 10, wherein the deep learning model is a transformer-based model, the transformer-based model comprises a plurality of conversion blocks sequentially connected, the conversion blocks comprise a plurality of encoding blocks and a plurality of decoding blocks, and self-attention modules of each of the conversion blocks comprise an intra-histogram self-attention module and an inter-histogram self-attention module.

13. The image processing system according to claim 12, wherein an output of the intra-histogram self-attention module is connected to an input of the inter-histogram self-attention module, a plurality of histogram features input to the intra-histogram self-attention module are respectively feature matrices of 1*M, the histogram features comprise M feature values, the intra-histogram self-attention module generates a plurality of intra-histogram self-attention features based on one feature value corresponding to one position token, the intra-histogram self-attention features input to the inter-histogram self-attention module are respectively feature matrices of 1*M, the inter-histogram self-attention module generates a plurality of inter-histogram self-attention features based on one histogram self-attention feature corresponding to one position token.

14. The image processing system according to claim 12, wherein each of the conversion blocks further comprises a multilayer perceptron module, each of the encoding blocks comprises a downsampling module, each of the decoding blocks comprises an upsampling module, an output of the self-attention module of each of the conversion blocks is connected to an input of the multilayer perceptron module, an output of the multilayer perceptron module of each of the encoding blocks is connected to an input of the downsampling module, an output of the multilayer perceptron module of each of the decoding blocks is connected to an input of the upsampling module.

15. The image processing system according to claim 12, wherein the transformer-based model further comprises a first convolution module, a second convolution module, and an adding module, the original histogram is input to the first convolution module, an output of the first convolution module is connected to one of the encoding blocks, an input of the second convolution module is connected to an output of one of the decoding blocks, an output of the second convolution module is connected to an input of the adding module, the original histogram is input to another input of the adding module, and the adding module outputs the optimized histogram.

16. The image processing system according to claim 10, wherein the processor is further configured to: adjust the original underwater image by using the optimized histogram to obtain a target image; and input the target image into another deep learning model, and generate the optimized underwater image through the another deep learning model.

17. The image processing system according to claim 10, wherein the another deep learning model is a generative adversarial network model, the loss functions further comprise a fourth loss function and a fifth loss function, a fourth loss function calculates a fourth loss value according to the target image, the real reference image, and the optimized underwater image through a generative adversarial network error calculation method, and the fifth loss function calculates a fifth loss value according to the optimized underwater image and the real reference image.

18. The image processing system according to claim 10, wherein the processor is further configured to: calculate the first loss value according to a weight value of each of a plurality of color channels, wherein the weight value of a red channel among the color channels is greater than the weight value of other color channels.

* * * * *